Jan. 5, 1960 F. N. BRAUER 2,920,216
TRANSISTOR MULTIVIBRATOR
Filed Sept. 18, 1956
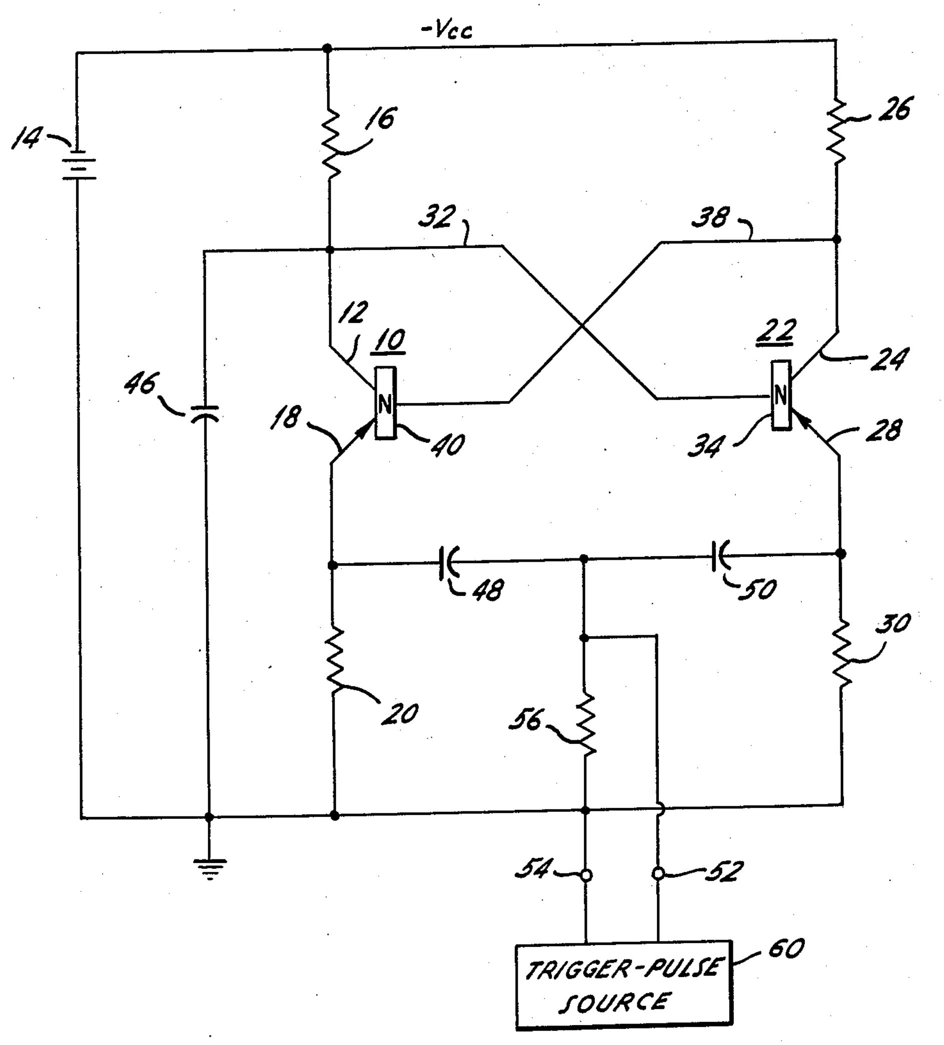
INVENTOR.
FREDERICK N. BRAUER
BY
Dean V. Hazeltine
ATTORNEY United States Patent Office 2,920,216

Patented Jan. 5, 1960

2,920,216

TRANSISTOR MULTIVIBRATOR

Frederick N. Brauer, North Hills, Pa., assignor to Philco Corporation, Philadelphia, Pa., a corporation of Pennsylvania Application September 18, 1956, Serial No. 610,622

8 Claims. (Cl. 307—88.5)

The present invention relates to transistor circuits of the pulse type, and particularly to bistable multivibrator circuits utilizing direct-coupled transistors in the common-emitter configuration.

Transistor circuits are known in the prior art in which two common-emitter transistor stages are interconnected so that, in a first stable condition, one of the transistors is more conductive than the other, while in a second stable state it is less conductive than the other. Thus there exist two stable conduction conditions for the device, to either of which it can be shifted by the application of appropriate triggering impulses.

One such bistable circuit of particular utility and great simplicity employs a pair of transistors connected in the common-emitter configuration, together with a direct cross-connection between the collector of each transistor and the base of the other transistor. Such a device is shown and described in the copending application Serial No. 482,344 of Ralph B. Brown, filed January 17, 1955, and entitled "Electrical System." As described in that application, such a bistable multivibrator circuit may be caused to operate in one of its two stable conditions by the application of a trigger pulse to the collector element of one of the transistors, and may be returned to its other stable state by the application of a trigger pulse to the collector of the other transistor. Such an element is particularly suited for use in computer circuits of the binary type, and has been widely used for this purpose.

While a transistor multivibrator actuatable in the aforementioned manner is highly satisfactory for many purposes, it is also highly advantageous in some applications to be able to cause a bistable transistor multivibrator to shift from one to the other of its two stable states in response to successive pulses of the same polarity, applied from a common control line. While such operation has been obtained with bistable multivibrators of the vacuum-tube type, it has not heretofore been possible in transistor multivibrators of the general class discussed herein. One of the main reasons for this difference in triggering of vacuum-tube multivibrators as compared to transistor circuits is believed to be the fact that, in a vacuum tube, the transconductance is a strong function of the control potential applied to the grid, while in the case of a transistor the alpha of the transistor typically changes only very slightly when the base-to-emitter current is varied over its normal operating range. Accordingly, while in vacuum-tube circuits triggering may be accomplished by using the trigger impulse to produce large differences in the transconductances of the two vacuum-tube devices, such operation is not generally feasible in transistor devices, and in particular has not been effective to provide switching of a bistable transistor multivibrator between its two alternate states in response to successive pulses of the same polarity applied from a common control line.

Accordingly, it is an object of the invention to provide an improved transistor multivibrator circuit of the bistable type.

Another object is to provide such a circuit which can be switched between its two stable states by means of successive pulses of the same polarity applied to the multivibrator circuit from a common control line.

A further object is to provide such a circuit in which the actuating impulses may be of relatively small amplitude.

Still another object is to provide such a circuit which may be switched between its two stable states at a relatively high rate.

It is another object to provide a bistable transistor multivibrator employing a pair of transistors arranged in the common-emitter configuration and having a direct interconnection between the base of each transistor and the collector of the other transistor, and which may be switched between its two stable states by means of successive pulses of the same polarity applied thereto from a single control line.

Still another object is to provide a transistor multivibrator of the bistable type in which a single cycle of operation of each transistor is produced in response to two sequential actuating pulses of the same polarity.

The above stated objectives are accomplished in accordance with the invention by the provision of a bistable multivibrator comprising a pair of transistors arranged in the common-emitter configuration and each having impedance elements in the emitter and collector circuits thereof, together with a direct cross-connection between the base of each transistor and the collector of the other transistor. A capacitive element is also connected between the collector circuit of one of the transistors and a source of reference potential therefor, while a pair of capacitive elements are connected in series between the emitter elements of the two transistors. Trigger pulses of the same polarity as the conductivity-type of the transistors may then be applied to the interconnection between the last-named pair of reactive elements, the amplitude of these pulses preferably being greater than the static emitter-to-collector voltage of either transistor and less than the supply voltage. Each successive pulse applied to the trigger input terminals then changes the multivibrator from one of its stable conduction states to the other. The device may therefore be utilized as a binary counter, such as is useful in digital computer devices.

As will be set forth in detail hereinafter, it appears that the characteristics of transistors which permit actuation of the multivibrator from one stable state to the other in this manner comprise one or both of the transistor phenomena of minority-carrier saturation and inverted operation. Minority-carrier saturation refers to that condition of the semiconductive device which occurs when the base potential becomes as negative as the collector potential, whereby minority-carriers injected into the body accumulate therein and tend to persist in the body after the voltages inducing saturation have been removed, for a period of time commonly referred to as the "clean-up" time. The characteristic of inverted operation referred to herein is that property by virtue of which the normal emitter of a transistor may be utilized as the collector while the collector is utilized as the emitter, by interchanging the polarities of the potentials applied to these elements. It will be understood that these properties of transistor devices do not exist in vacuum tubes, and hence cannot be exploited to produce triggering.

In addition the circuit makes use of the fact that the emitter of that transistor which is conducting more heavily in one conduction state of the multivibrator is biased in the forward direction less strongly than the transistor which is then conducting less heavily, a factor which is also exploited to predispose the then low-conduction transistor to become the heavily-conducting transistor at the time of switching from one state to the other.

Other objects and features of the invention will become apparent from a consideration of the following detailed description, taken in connection with the accompanying drawing which comprises a schematic diagram of a representative embodiment of the invention.

In the embodiment of the invention shown in the drawing, transistor 10 is of a type having an N-type base region, and is preferably of the surface-barrier type. Collector element 12 of transistor 10 is supplied with negative biasing voltage $-V_{cc}$ from battery 14 by way of collector load resistor 16, while the emitter element 18 thereof is connected to a source of reference potential, designated as ground, by way of emitter load resistor 20. The similar transistor 22 is supplied with negative bias potential for its collector 24 from the same battery 14 by way of a collector load resistor 26, while its emitter electrode 28 is connected to a source of reference potential by way of emitter load resistor 30. A direct connection 32 from the collector 12 of transistor 10 to the base 34 of transistor 22 is also provided, as well as a corresponding direct connection 38 from the collector 24 of transistor 22 to the base 40 of transistor 10.

In accordance with the invention, there is also provided a capacitor 46 connected between the collector 32 of transistor 10 and the source of reference potential, and a pair of serially-disposed capacitors 48 and 50 connected between emitters 18 and 28 of transistors 10 and 22, respectively. The interconnection between capacitors 48 and 50 is connected to one trigger input terminal 52, while the other trigger input terminal 54 is connected to the source of reference potential. In addition an input resistor 56 is shown connected between the trigger input terminals, although it will be understood that this resistor may instead be contained within the trigger pulse source 60.

Trigger pulse source 60 represents a device for producing one or more negatively-directed pulses of voltage for actuating the multivibrator circuit to cause it to shift from one to the other of its stable operating conditions. Since it may take any of a large variety of forms, it has not been shown in detail. In a typical application it may comprise an element of a computer of the binary type, or simply a generator of negative pulses whose repetition rate is to be divided in half by the multivibrator circuit of the invention. For reasons which will become apparent from the description of the operation of the multivibrator of the invention, these negative pulses are preferably greater in amplitude than the emitter-to-collector bias existing on either of the transistors 10 and 22 when in either of their stable conduction states, are not substantially longer than the discharge time-constants of the capacitors 46, 48 and 50 and their associated resistances, and in addition preferably have steep trailing edges for best triggering operation.

The general operation of the multivibrator shown in the figure is then as follows. In the stable condition existing during intervals of non-occurrence of trigger pulses, one of transistors 10 and 22 conducts more heavily than the other. Upon the occurrence of a negative trigger pulse from source 60, the multivibrator is caused to shift to its other operating condition, and that transistor which was previously the more conductive of the pair becomes the less conductive. Upon the occurrence of the next negative trigger pulse, the multivibrator is returned to its original operating condition. Output signals from the multivibrator may be derived from one or both of the transistor collector elements.

While not intending thereby to limit the scope of the invention, the following theory of the operation of my novel circuit is provided as an aid in applying the invention in various situations.

Assuming that initially the left-hand transistor 10 is in its more conductive condition while the right-hand transistor 22 is in its less conductive condition, and assuming that the collector and emitter resistors of the two transistors are substantially the same in value, the collector of transistor 10 is initially less negative than that of transistor 22 and the emitter of transistor 10 is more negative than that of transistor 22. Because of the direct cross-connections between the transistors, this means also that the base voltage of transistor 22 is initially less negative than that of transistor 10, thereby maintaining the above-mentioned more conductive condition in transistor 10.

Application of a negative trigger pulse to input terminals 52 and 54 then causes the emitter elements of both of transistors 10 and 22 to become more negative than their respective base elements. In the case of transistor 22, the base voltage is held at its previous value during the trigger pulse by the capacitor 46, so that transistor 22 is cut-off substantially completely by the trigger pulse. The negative trigger pulse is of sufficient amplitude to cause the emitter of transistor 22 to become more negative than its collector during the trigger pulse, so that transistor 22 is biased in the inverted condition. However, since both emitter and collector elements 28 and 24 thereof are negative with respect to base element 34, transistor 22 is nonetheless substantially cut-off. In the absence of the interconnection 38, the effect of this cutting-off of transistor 22 would be for the collector voltage thereof to become as negative as the supply voltage. However, although this tendency exists, current conduction through the base of transistor 10 by way of the interconnection 38 prevents this extreme negative variation from occurring, as will become apparent hereinafter.

In the case of transistor 10, the effect of the negative trigger pulse on the emitter 18 thereof is to make the emitter 18 more negative than the collector 12, and thus place transistor 10 also in the inverted operating condition. However, transistor 10 is not cut off under these conditions because of the aforementioned connection of its base element to the collector of transistor 22, which collector, as also mentioned hereinabove, tends to approach the negative supply potential during the trigger pulse. The ultimate base potential of transistor 10 during the trigger pulse is however limited by resistor 26, through which flows the base current for transistor 10. Since the supply voltage is substantially more negative than any other potential in the circuit, the transistor 10 is in the saturated condition during the trigger pulse and therefore conducts heavily, with the usual collector element operating as an emitter of minority-carriers.

Upon the termination of the trigger pulse, the emitter voltage of transistor 22 tends to return to its original potential, and this transistor again draws current through the collector resistor 26. At the same time, the emitter of transistor 10 tends to return to its original potential, and therefore resumes operation in the normal mode. However, apparently because of the "clean-up" time required to eliminate the excess minority-carriers existing in the saturated transistor 10, the relatively heavy base current of transistor 10 continues momentarily after transistor 22 has become conductive, with the result that the collector potential of transistor 22 and the base potential of transistor 10 assume a potential nearer to zero than the base potential of transistor 22. Consequently the collector voltage of transistor 10 begins to become more negative, and transistor 22 becomes the more conductive transistor while transistor 10 becomes the less conductive transistor. Once the multivibrator has been caused in this manner to shift to its other stable state, the static potentials of the two transistors are interchanged with respect to those previously existing. Thus the base and emitter of transistor 22 are now more negative than the base and emitter of transistor 10, while the collector of transistor 22 is less negative than that of transistor 10.

Upon the occurrence of the next negative pulse applied to input terminals 52 and 54, transistor 10 is cut off and is placed in the inverted condition, while transistor 22 is also placed in the inverted condition but is conductive because of emission of minority-carriers by the normal collector 24. As a result, the collector of transistor 22 tends suddenly to become more negative, while the collector voltage of transistor 10 is maintained substantially invariant by capacitor 46. Upon the termination of this second trigger pulse, transistor 10 again becomes conductive in the normal mode, as does transistor 22. However since, during the trigger pulse, conduction by way of the base of transistor 22 has made the collector voltage of transistor 10 somewhat more positive, since the cutting off of the base of transistor 10 has caused the collector voltage of transistor 22 to become somewhat more negative, and since the emitter voltage of transistor 10 is substantially more negative than that of transistor 22 at the termination of this trigger pulse, conduction in transistor 22 decreases and that in transistor 10 increases until the original conduction condition is attained in which transistor 10 is the more conductive and transistor 22 is the less conductive of the two transistors.

Without intending thereby to limit the scope of the invention, the following specific values of one typical circuit embodying the invention are now set forth in the interests of complete definiteness:

| | |
|---|---|
| Resistors 16 and 26 | 1,000 ohms. |
| Resistors 20 and 30 | 220 ohms. |
| Negative supply voltage $V_{cc}$ | −3 volts. |
| Capacitor 46 | 510 micromicrofarads. |
| Capacitors 48 and 50 | 820 micromicrofarads. |
| Transistors 10 and 22 | N-type surface barrier transistor, such as the type SB–100. |
| Input resistor 56 | 50 ohms. |
| Negative trigger pulse amplitude | −0.5 volt. |
| Collector and emitter voltages of transistor 10 in its more conductive state | −0.63 volt and −0.59 volt, respectively. |
| Collector and emitter voltages of transistor 10 in its less conductive state | −0.85 and −0.41 volt, respectively. |

With these values of circuit parameters and voltages, actuation of the multivibrator between its two conduction states was produced by negative trigger pulses of durations of about 50 millimicroseconds, and pulse rise and fall times of the order of 20 millimicroseconds. Satisfactory operation in this manner was obtained for trigger pulse repetition rates as high as 3 megacycles per second. For operation at such high repetition rates, the time-constants of capacitor 48 and resistor 20, of capacitor 50 and resistor 30, and of capacitor 46 and resistor 16 in parallel with the base resistance of transistor 22 or the collector resistance of transistor 10 are each preferably long compared to the duration of the trigger pulse and short compared to the interpulse period.

It will be understood that transistors having P-type base regions may also be utilized in the circuit of the invention when appropriate reversal of the polarities of biasing and triggering potentials are made in a manner well known in the art.

While the invention has been shown and described with respect to a representative embodiment thereof, it will be understood that it is susceptible of embodiment in a wide variety of forms without departing from the scope of the invention, as defined by the appended claims.

I claim:

1. A transistor multivibrator circuit comprising a first and a second transistor each having emitter, collector and base elements, means for connecting said first and said second transistors in the common-emitter configuration, a first resistive element in the collector circuit of said first transistor, a second resistive element in the emitter circuit of said first transistor, a third resistive element in the collector circuit of said second transistor, a fourth resistive element in the emitter circuit of said second transistor, a first direct cross-connection of substantially zero impedance from said collector element of said first transistor to said base element of said second transistor, a second direct cross-connection of substantially zero impedance from said collector element of said second transistor to said base element of said first transistor, a capacitor having one terminal thereof connected to said collector element of said first transistor and the other terminal thereof connected to a point at a reference potential, and a pair of capacitors connected serially between said emitter element of said first transistor and said emitter element of said second transistor.

2. The circuit of claim 1, in which said first and third resistive elements are substantially equal in value.

3. The circuit of claim 1, in which said second and fourth resistive elements are substantially equal in value.

4. The circuit of claim 1, in which said first and third resistive elements are each substantially larger in value than said second and fourth resistive elements, respectively.

5. The circuit of claim 1, in which said transistors are of a type having an N-type base region.

6. A transistor multivibrator circuit comprising a source of potential having a positive pole and a negative pole, a first transistor and a second transistor each having at least emitter, collector and base elements and each having a common-base current-multiplication factor of less than 1, a first resistor connecting said collector element of said first transistor to one of said poles, a second resistor connecting said collector element of said second transistor to said one pole, a third resistor connecting said emitter element of said transistor to the other of said poles, a fourth resistor connecting said emitter element of said second transistor to said other pole, a first direct cross-connection of substantially zero impedance from said collector element of said first transistor to said base element of said second transistor, a second direct cross-connection of substantially zero impedance from said collector element of said second transistor to said base element of said first transistor, a capacitor having one terminal thereof connected to the collector element of one of said transistors and the other terminal thereof connected to one of said poles, a second capacitor having one of its terminals connected to said emitter element of said first transistor, a third capacitor having one of its terminals connected to said emitter element of said second transistor, and a connection between the other terminals of said second and third capacitors.

7. A transistor circuit, comprising: a first transistor having at least emitter, collector and base elements and a second transistor also having at least emitter, collector and base elements, each of said first and second transistors having a grounded-base current-multiplication factor of less than 1; means for connecting said first transistor and said second transistor each in the common-emitter circuit configuration, said last-named means including a first resistive element in the collector circuit of said first transistor, a second resistive element in the emitter circuit of said first transistor, a third resistive element in the collector circuit of said second transistor, and a fourth resistive element in the emitter circuit of said second transistor; means providing a direct cross-connection of substantially zero impedance from said collector element of said first transistor to said base element of said second transistor; means providing a direct cross-connection of substantially zero impedance from said collector element of said second transistor to said base element of said first transistor; a first capacitive element having one terminal thereof connected to the collector element of one of said transistors and the other terminal thereof connected to a point of reference potential; second and third capacitive elements connected in series between the emitter elements of said first and second transistors; and means for applying, between the common connection of said second and third capacitive elements and a point of reference potential, actuating pulses having the same polarity as the conductivity type of the base regions of said first and second transistors.

8. A circuit in accordance with claim 7, in which said last-named means comprises a source of pulses having amplitudes greater than the static emitter-to-collector potential of either of said first and second transistors.

References Cited in the file of this patent

UNITED STATES PATENTS

| | | |
|---|---|---|
| 2,605,306 | Eberhard | July 29, 1952 |
| 2,641,717 | Toth | June 9, 1953 |
| 2,802,067 | Zawels | Aug. 6, 1957 |
| 2,806,153 | Walker | Sept. 10, 1957 |
| 2,827,574 | Schneider | Mar. 18, 1958 |